US011823432B2

(12) United States Patent
Li et al.

(10) Patent No.: US 11,823,432 B2
(45) Date of Patent: Nov. 21, 2023

(54) SALIENCY PREDICTION METHOD AND SYSTEM FOR 360-DEGREE IMAGE (71) Applicant: SHANGHAI JIAO TONG UNIVERSITY, Shanghai (CN)

(72) Inventors: Chenglin Li, Shanghai (CN); Haoran Lv, Shanghai (CN); Qin Yang, Shanghai (CN); Junni Zou, Shanghai (CN); Wenrui Dai, Shanghai (CN); Hongkai Xiong, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/164,610

(22) Filed: Feb. 5, 2023

(65) Prior Publication Data

US 2023/0245419 A1    Aug. 3, 2023

Related U.S. Application Data (63) Continuation of application No. PCT/CN2021/112902, filed on Aug. 17, 2021.

(30) Foreign Application Priority Data

Sep. 8, 2020  (CN) .......................... 202010932741.9

(51) Int. Cl.
*G06V 10/46* (2022.01)
*G06T 5/00* (2006.01)
(Continued)

(52) U.S. Cl.
CPC ............ *G06V 10/462* (2022.01); *G06T 5/002* (2013.01); *G06T 5/20* (2013.01); *G06V 10/426* (2022.01);
(Continued)

(58) Field of Classification Search
CPC .... G06V 10/462; G06V 10/426; G06V 10/44; G06V 10/82; G06T 5/002; G06T 5/20; H04N 23/698
See application file for complete search history.

(56) References Cited

U.S. PATENT DOCUMENTS

2018/0160123 A1*  6/2018  Van Der Auwera ........................ H04N 19/167
2018/0300583 A1   10/2018  Peng et al.
(Continued)

FOREIGN PATENT DOCUMENTS

CN    108492322 A    9/2018
CN    110365966 A    10/2019
(Continued)

OTHER PUBLICATIONS

Zhu et al, Automatic Salient Object Detection for Panoramic Images Using Region Growing and Fixation Prediction Model, Journal of Latex Class Files, vol. 14, No. 8, Aug. 2015 1 (Year: 2015).*
(Continued)

*Primary Examiner* — Andrae S Allison
(74) *Attorney, Agent, or Firm* — True Shepherd LLC; Andrew C. Cheng (57) ABSTRACT The present disclosure provides a saliency prediction method and system for a 360-degree image based on a graph convolutional neural network. The method includes: firstly, constructing a spherical graph signal of an image of an equidistant rectangular projection format by using a geodesic icosahedron composition method; then inputting the spherical graph signal into the proposed graph convolutional neural network for feature extraction and generation of a spherical saliency graph signal; and then reconstructing the spherical saliency graph signal into a saliency map of an equidistant rectangular projection format by using a proposed spherical crown based interpolation algorithm. The
(Continued)

present disclosure further proposes a KL divergence loss function with sparse consistency. The method can achieve excellent saliency prediction performance subjectively and objectively, and is superior to an existing method in computational complexity.

9 Claims, 6 Drawing Sheets

(51) Int. Cl.
  *G06T 5/20* (2006.01)
  *H04N 23/698* (2023.01)
  *G06V 10/44* (2022.01)
  *G06V 10/82* (2022.01)
  *G06V 10/426* (2022.01)

(52) U.S. Cl.
  CPC .............. *G06V 10/44* (2022.01); *G06V 10/82* (2022.01); *H04N 23/698* (2023.01)

(56) References Cited

U.S. PATENT DOCUMENTS

| | | | |
|---|---|---|---|
| 2018/0310010 A1* | 10/2018 | Hourunranta | H04N 19/34 |
| 2019/0174150 A1* | 6/2019 | D'Acunto | H04N 21/43072 |
| 2019/0317594 A1 | 10/2019 | Stent | |
| 2019/0355126 A1 | 11/2019 | Sun et al. | |
| 2020/0404327 A1* | 12/2020 | Han | H04N 13/388 |
| 2021/0287362 A1* | 9/2021 | Zheng | G06T 7/97 |
| 2022/0188982 A1* | 6/2022 | Sun | G06T 5/003 |

FOREIGN PATENT DOCUMENTS

| | | |
|---|---|---|
| CN | 110503651 A | 11/2019 |
| CN | 111127298 A | 5/2020 |
| CN | 111160436 A | 5/2020 |
| CN | 112163990 A | 1/2021 |

OTHER PUBLICATIONS

Xin et al, Exploiting Local and Global Characteristics for Contrast Based Visual Saliency Detection, J. Shanghai Jiaotong Univ. (Sci.), 2015, 20(1): 14-20 (Year: 2015).*

Yue Wang, Yongbin Sun, Ziwei Liu, Sanjay E Sarma, Michael M Bronstein, and Justin M Solomon. Dynamic graph cnn for learning on point clouds. arXiv preprint arXiv:1801.07829, 2018 (Year: 2018).*

Mao J, Wang X, Li H. Interpolated convolutional networks for 3D point cloud understanding. In: 2019, IEEE/CVF International Conference on Computer Vision, ICCV 2019, Seoul, Korea (South), Oct. 27-Nov. 2, 2019. IEEE; 2019:1578-1587 (Year: 2019).*

Niu, Y., Lin, L., Chen, Y. et al. Machine learning-based framework for saliency detection in distorted images. Multimed Tools Appl 76, 26329-26353 (2017). https://doi.org/10.1007/s11042-016-4128-1 (Year: 2017).*

Lv, Haoran, et al. "SalGCN: Saliency prediction for 360-degree images based on spherical graph convolutional networks." Proceedings of the 28th ACM International Conference on Multimedia. 2020. (Year: 2020).*

Q. Yang, C. Li, W. Dai, J. Zou, G.-J. Qi and H. Xiong, "Rotation Equivariant Graph Convolutional Network for Spherical Image Classification," 2020 IEEE/CVF Conference on Computer Vision and Pattern Recognition (CVPR), Seattle, WA, USA, 2020, pp. 4302-4311, doi: 10.1109/CVPR42600.2020.00436. (Year: 2020).*

Ying Ding et al., ACTA Electronica Sinica, An Overview of Research Progress on Saliency Detection of Panoramic VR Images, Jul. 2019, vol. 47, No. 7, pp. 1576-1583, China.

* cited by examiner

SALIENCY PREDICTION METHOD AND SYSTEM FOR 360-DEGREE IMAGE

CROSS-REFERENCE TO RELATED APPLICATIONS

This application is a continuation of International Patent Application No. PCT/CN2021/112902 with a filing date of Aug. 17, 2021, designating the United States, now pending, and further claims priority to Chinese Patent Application No. 202010932741.9 with a filing date of Sep. 8, 2020. The content of the aforementioned applications, including any intervening amendments thereto, are incorporated herein by reference.

TECHNICAL FIELD

The present disclosure relates to an image saliency prediction technology in the technical field of digital image processing, in particular to a saliency prediction method and system for a 360-degree image based on a graph convolutional neural network.

BACKGROUND ART

In the field of computer vision, visual saliency prediction is a very important and challenging problem. The main goal of this task is to locate the part of a scene that people are more concerned about and generate a visual saliency map. In recent years, with the development of VR, AR and autonomous driving, the saliency prediction task of 360-degree images and videos is facing great challenges: in 360-degree scenes, a visual saliency prediction model needs to analyze spherical features and mark saliency areas. A saliency map generated finally can further provide prior support for intelligent video coding, 360-degree video automatic photography, 360-degree video viewpoint prediction and other tasks, and promote development of many fields.

Through the literature search of the prior art, it is found that R. Monroy, S. Lutz and A. Smolic, et al., in the article "SAL NET360: Saliency maps for omni-directional images with CNN" published in the journal SIGNAL PROCESSING-IMAGE COMMUNICATION in 2018, proposed a method for saliency prediction of a 360-degree image using a convolutional neural network. This method projects the 360-degree image on six tangent planes through cube projection, then extracts features from each tangent plane image by using a depth convolutional network and generates six corresponding saliency maps. Finally, the six saliency maps are spliced into a saliency map of an equidistant rectangular projection format by a splicing algorithm. However, projecting the 360-degree image onto Euclidean space will inevitably introduce distortion, which will further affect feature extraction performance of the convolutional neural network. In addition, inputting multiple tangent plane images into the neural network will cause a lot of computational overhead.

Through the literature search of the prior art, it is also found that Ziheng Zhang, Yanyu Xu and Jingyi Yu et al., in the paper "Saliency detection in 360 videos" published in the European Conference on Computer Vision in 2018, proposed a spherical CNN defined on an equidistant rectangular projection plane to adapt to spherical data. The central idea is to define a convolutional kernel with a fixed shape at the north pole of an equidistant rectangular grid, and then rotate a spherical image and resample the convolutional kernel position for convolution. The whole convolution operation needs to rotate and resample the spherical image and a feature graph continuously, which makes original pixel positions of the rotated image and feature graph not always cover the convolutional kernel position, that is, the image and feature graph need an interpolation operation to obtain eigenvalues aligned with the convolutional kernel position. However, the interpolation operation will introduce errors into convolution; and with deepening of the network, the errors will accumulate continuously, which will in the end seriously affect model performance.

SUMMARY OF THE INVENTION

Aiming at the above shortcomings in the prior art, the present disclosure provides a saliency prediction method for a 360-degree image based on a graph convolutional neural network.

The present disclosure is realized by the following technical solution. According to one aspect of the present disclosure, a saliency prediction method for a 360-degree image based on a graph convolutional neural network is proposed and includes:

constructing a graph signal of a 360-degree image of an equidistant rectangular projection format by using a geodesic icosahedron projection technology, and generating a spherical graph signal;

inputting the generated spherical graph signal into the graph convolutional neural network for feature extraction, and outputting a single-channel saliency spherical graph signal with a size identical to that of the input spherical graph signal; interpolating the output single-channel saliency spherical graph signal by using a spherical crown based interpolation algorithm, so as to convert the single-channel saliency spherical graph signal into an image of an equidistant rectangular projection format, and further reconstruct a 360-degree saliency map of the equidistant rectangular projection format; and predicting saliency of the 360-degree image according to the reconstructed 360-degree saliency map of the equidistant rectangular projection format. Preferably, the geodesic icosahedron projection technology adopts a geodesic icosahedron composition method in a spherical graph convolutional network (SGCN), and the geodesic icosahedron composition method includes:

firstly, constructing the largest inscribed icosahedron for the 360-degree image, wherein twelve vertices of the icosahedron are used as a spherical graph signal of level 0;

then, taking a midpoint of each edge of the icosahedron and extending a center of a sphere to intersect with a spherical surface through a midpoint structural ray, wherein intersecting nodes are new sampling points; combining the new sampling points with sampling points of level 0 to form a spherical graph signal of level 1; and based on the obtained new sampling points, repeating the process continuously to generate a higher-level spherical graph signal, which is the generated spherical graph signal. Preferably, the graph convolutional neural network includes a graph convolutional layer, a graph pooling layer and a graph unpooling layer:

the graph convolutional layer adopts a convolution operation in a Chebyshev network (ChebNet) to extract features of a spherical graph signal;

the graph pooling layer adopts a rotation-equivariant pooling operation in SGCN to down-sample the spherical graph signal; and the graph unpooling layer introduces feature information of neighboring nodes in an unpooling process, and up-samples the spherical graph signal.

Preferably, the graph convolutional neural network (SGCN) adopts an encoder-decoder network structure, and includes:

an encoder including 5 graph convolutional layers and 4 graph pooling layers, and encoding the input spherical graph signal into a high-dimensional graph signal with the size of 1/256 of an original size;

a decoder including 5 graph convolutional layers and 4 graph unpooling layers, and decoding the high-dimensional graph signal encoded by the encoder into a one-dimensional graph signal with a same size as the input spherical graph signal to represent saliency distribution; and inputs of first 4 graph convolutional layers of the decoder are respectively constituted by connection of the output of the previous graph convolutional layer with a feature graph with a same number of nodes in the decoder part.

Preferably, the graph convolutional neural network uses a KL (Kullback-Leibler) divergence loss function with a sparse consistency feature for network training; and the KL divergence loss function $KL_{sc}$ is expressed as:

$$KL_{sc} = \frac{\lambda}{1+\lambda} KL_s + \frac{1}{1+\lambda} KL_{hist}$$

where:

$$KL_s = \sum_{t=1}^{N} G_{gt}(v_t) \log \left[ \frac{G_{gt}(v_t)}{G_s(v_t)} \right],$$

$$KL_{hist} = \sum_{i=1}^{255} hist(G_{gt})(i) \log \left[ \frac{hist(G_{gt})(i)}{hist(G_s)(i)} \right]$$

where: $G_{gt}(v_t)$ and $G_s(v_t)$ represent a spherical graph signal constructed by a true saliency map and a spherical saliency graph signal predicted by the network, respectively; $KL_s$ represents the traditional KL divergence loss of $G_{gt}(v_t)$ and $G_s(v_t)$; hist( · ) represents histogram solution of a vector, which here means solution of histogram distribution of values of the spherical graph signal; then the histogram distribution of $G_{gt}(v_t)$ and $G_s(v_t)$ is calculated to obtain $KL_{hist}$; and finally the loss function $KL_{sc}$ with sparse consistency is obtained by introducing a weighting λ. Preferably, the spherical crown based interpolation algorithm includes:

firstly, calculating spherical coordinates of grid points of a standard equidistant rectangular projection format; secondly, constructing a spherical crown with a fixed size on the spherical surface with each grid point as the center; then, counting all the nodes falling on the spherical crown in a single-channel saliency spherical graph signal and calculating an Euclidean distance between the nodes and the center of the spherical crown; and finally, calculating pixel values of the center of the spherical crown, i.e., the grid points of the equidistant rectangular projection format, by inverse distance weighting of all the nodes falling on the spherical crown in the single-channel saliency spherical graph signal, and reconstructing the 360-degree saliency map of the equidistant rectangular projection format.

Preferably, the method further includes:

smoothing the obtained 360-degree saliency map of the equidistant rectangular projection format by a Gaussian kernel to obtain a smoother saliency map.

According to another aspect of the present disclosure, a saliency prediction system for a 360-degree image based on a graph convolutional neural network is provided and includes:

a graph signal construction module configured to construct a graph signal of a 360-degree image of an equidistant rectangular projection format by using a geodesic icosahedron composition module, and generate a spherical graph signal;

a graph convolutional network module configured to input the generated spherical graph signal into the graph convolutional neural network for feature extraction, and output a single-channel saliency spherical graph signal with a size identical to that of the input spherical graph signal; and an interpolation and reconstruction module configured to interpolate the output single-channel saliency spherical graph signal by using a spherical crown based interpolation algorithm, so as to convert the single-channel saliency spherical graph signal into an image of an equidistant rectangular projection format, and further reconstruct a 360-degree saliency map of the equidistant rectangular projection format, and predict saliency of the 360-degree image according to the reconstructed 360-degree saliency map of the equidistant rectangular projection format.

Preferably, the geodesic icosahedron composition module adopts a spherical graph signal generated by a geodesic icosahedron composition method in SGCN. Preferably, the graph convolutional neural network adopts an encoder-decoder network structure, and includes: an encoder including 5 graph convolutional layers and 4 graph pooling layers, and encoding the input spherical graph signal into a high-dimensional graph signal with the size of 1/256 of an original size; a decoder including 5 graph convolutional layers and 4 graph unpooling layers, and decoding the high-dimensional graph signal encoded by the encoder into a one-dimensional graph signal with the same size as the input spherical graph signal to represent saliency distribution; and inputs of first 4 graph convolutional layers of the decoder are respectively constituted by connection of the output of the previous graph convolutional layer with a feature graph with the same number of nodes in the decoder part.

Preferably, the system is defined as a graph node level regression model; and the saliency prediction result is an objective optimization problem of the regression model, so that:

$$\min_{\theta_k} \sum_{t=0}^{N} dist | GICOPix(E_{gt})[v_t], N_G(GICOPix(E_i))[v_t] |$$

where: $E_i$ and $E_{gt}$ respectively represent the 360-degree image of the equidistant rectangular projection format and a corresponding true saliency map, which are constructed into spherical graph signals with the same number of nodes by the geodesic icosahedron composition module GICOPix( · ). Then, the constructed spherical graph signals are input into the graph convolutional neural network $N_G$( · ) to generate the saliency spherical graph signals predicted by the network. The objective optimization process is to optimize learnable weights $\theta_k$, so that the distance between the saliency spherical graph signal output by the graph convolutional neural network and the true saliency graph signal is as small as possible, thereby realizing training of the regression model.

Due to use of the technical solution, compared with the prior art, the present disclosure has the following beneficial effects:

The saliency prediction method and system for the 360-degree image based on the graph convolutional neural network provided by the present disclosure aim to improve saliency prediction efficiency and performance of the 360-degree image. According to the method and system provided by the present disclosure, image convolution is introduced for feature extraction, so that the problem of image distortion caused by 360-degree image projection transformation is fundamentally eliminated; moreover, the interpolation operation of a feature graph in the convolution process is avoided, thereby ensuring performance of the method; and more importantly, the method and system provided by the present disclosure directly process spherical data on the spherical graph signal, thereby avoiding huge calculation cost caused by projecting multiple planes to respectively predict the saliency in an existing method, and greatly improving saliency prediction efficiency.

BRIEF DESCRIPTION OF THE DRAWINGS

Other features, objects and advantages of the present disclosure will become more apparent by reading the detailed description of the non-limited embodiments with reference to the following drawings.

DETAILED DESCRIPTION OF THE INVENTION

The present disclosure will be described in detail with reference to the following specific embodiments. The following embodiments will help those skilled in the art further understand the present disclosure, but will not limit the present disclosure in any way. It should be pointed out that for those skilled in the art, several modifications and improvements can be made without departing from the concept of the present disclosure, which all belong to the scope of protection of the present disclosure.

An embodiment of the present disclosure provides a saliency prediction method for a 360-degree image based on a graph convolutional neural network. Aiming at the problems of poor prediction performance and high calculation cost or the like in the prior art, the method includes: firstly generating a spherical graph signal from a 360-degree image by a geodesic icosahedron composition method, then using a graph convolutional network to extract features of a spherical image and generate a saliency spherical graph signal, then reconstructing the graph signal into a 360-degree image of an equidistant rectangular projection format by an interpolation algorithm, and finally obtaining a final result by Gaussian kernel smoothing. The present embodiment avoids an interpolation operation of a feature graph in the convolution process to ensure the performance of the method, and greatly reduces calculation cost and improves prediction efficiency.

The saliency prediction method for a 360-degree image based on a graph convolutional neural network provided by the present embodiment includes the following steps:

step 1, constructing a graph signal of a 360-degree image of an equidistant rectangular projection format to generate a spherical graph signal;

step 2, inputting the spherical graph signal obtained in step 1 into the graph convolutional neural network for feature extraction, and generating a single-channel saliency spherical graph signal with a size identical to that of the input spherical graph signal; and step 3, reconstructing the saliency spherical graph signal output in step 2 by using a spherical crown based interpolation algorithm into a 360-degree saliency map of the equidistant rectangular projection format.

As a preferred embodiment, in step 1, geodesic icosahedron projection in a spherical graph convolutional network (SGCN) is used to generate the spherical graph signal. A specific construction method includes:

(1) firstly, constructing a largest internal icosahedron for a sphere, wherein twelve vertices of the icosahedron are used as a spherical graph signal of level 0;

(2) then, taking a midpoint of each edge of the icosahedron and extending a center of a sphere to intersect with a spherical surface through a midpoint structural ray, wherein intersecting nodes are new sampling points; combining the new sampling points with sampling points of level 0 to form a spherical graph signal of level 1; and (3) repeating the process of (2) iteratively for the spherical graph signal to generate a higher-level spherical graph signal, which is a generated spherical graph signal. As a preferred embodiment, in step 2, the graph convolutional neural network includes a graph convolutional layer, a graph pooling layer and a graph unpooling layer:

the graph convolutional layer adopts a convolution operation in a Chebyshev network (ChebNet) to extract features of a spherical graph signal;

the graph pooling layer adopts a rotation-equivariant pooling operation in SGCN to down-sample the spherical graph signal; and the graph unpooling layer uses a graph unpooling operation, namely, the graph unpooling layer introduces feature information of neighboring nodes in an unpooling process to up-sample the spherical graph signal.

As a preferred embodiment, in step 2, the graph convolutional neural network adopts an encoder-decoder network structure similar to U-net, and includes:

an encoder including 5 graph convolutional layers and 4 graph pooling layers, and encoding the input spherical graph signal into a high-dimensional graph signal with the size of 1/256 of an original size; and a decoder including 5 graph convolutional layers and 4 graph unpooling layers, and decoding the high-dimensional graph signal encoded by the encoder into a one-dimensional graph signal with a same size as the input spherical graph signal to represent saliency distribution.

Particularly, inputs of first 4 graph convolutional layers of the decoder are respectively constituted by connection of the output of the previous graph convolutional layer with a feature graph with a same number of nodes in the decoder part.

As a preferred embodiment, in step 2, the graph convolutional neural network uses a KL (Kullback-Leibler) divergence loss function with a sparse consistency feature for network training; and the KL divergence loss function $KL_{sc}$ is expressed as:

$$KL_{sc} = \frac{\lambda}{1+\lambda}KL_s + \frac{1}{1+\lambda}KL_{hist}$$

where:

$$KL_s = \sum_{t=1}^{N} G_{gt}(v_t)\log\left[\frac{G_{gt}(v_t)}{G_s(v_t)}\right],$$

$$KL_{hist} = \sum_{i=1}^{255} hist(G_{gt})(i)\log\left[\frac{hist(G_{gt})(i)}{hist(G_s)(i)}\right]$$

where: $G_{gt}(v_t)$ and $G_s(v_t)$ represent a spherical graph signal constructed by a true saliency map and a spherical saliency graph signal predicted by the network, respectively; $KL_s$ represents the traditional KL divergence loss of $G_{gt}(v_t)$ and $G_s(v_t)$; hist( · ) represents histogram solution of a vector, which here means solution of histogram distribution of values of the spherical graph signal; then the histogram distribution of $G_{gt}(v_t)$ and $G_s(v_t)$ is calculated to obtain $KL_{hist}$; and finally the loss function $KL_{sc}$ with sparse consistency is obtained by introducing a weighting λ. Specifically, the loss function includes KL divergence directly calculated for the graph signal and the KL divergence of the histogram distribution of the graph signal. For the KL divergence directly calculated for the graph signal, the KL divergence is directly calculated for the graph signal output by the graph convolutional neural network and the graph signal constructed by the true saliency graph. For the KL divergence of the histogram of the graph signal, firstly, the histogram distribution of the graph signal output by the network and the graph signal constructed by the true saliency graph is calculated; and then the KL divergence of the calculated histogram distribution is calculated. Finally, the KL divergence of the two parts is weighted to obtain the final KL divergence loss function with a sparse consistency feature, so as to achieve the similarity of both spatial distribution and numerical distribution.

As a preferred embodiment, in step 3, the spherical crown based interpolation algorithm is used to realize conversion of the spherical graph signal to the image of the equidistant rectangular projection format. Specifically, the process is divided into the following steps:

(a) calculating spherical coordinates of all grid points of an equidistant rectangular projection format;

(b) constructing a spherical crown area with each grid point as the center;

(c) determining nodes falling on each spherical crown area in the spherical graph signal;

(d) calculating an Euclidean distance between the nodes on each spherical crown area and the center of the spherical crown;

(e) calculating pixel values of the center of the spherical crown by inverse distance weighting of the nodes in each spherical crown area through the distances in (d); and (f) calculating a grid position of the equidistant rectangular projection format for the center of each spherical crown, wherein the pixel value of the spherical crown is the pixel value of the corresponding grid point.

As a preferred embodiment, the method further includes: step 4, smoothing the saliency map of the equidistant rectangular projection format obtained in step 3 by a Gaussian kernel to obtain a smoother saliency map.

The method provided by the present embodiment is further described below with reference to the following drawings.

Figure 1:
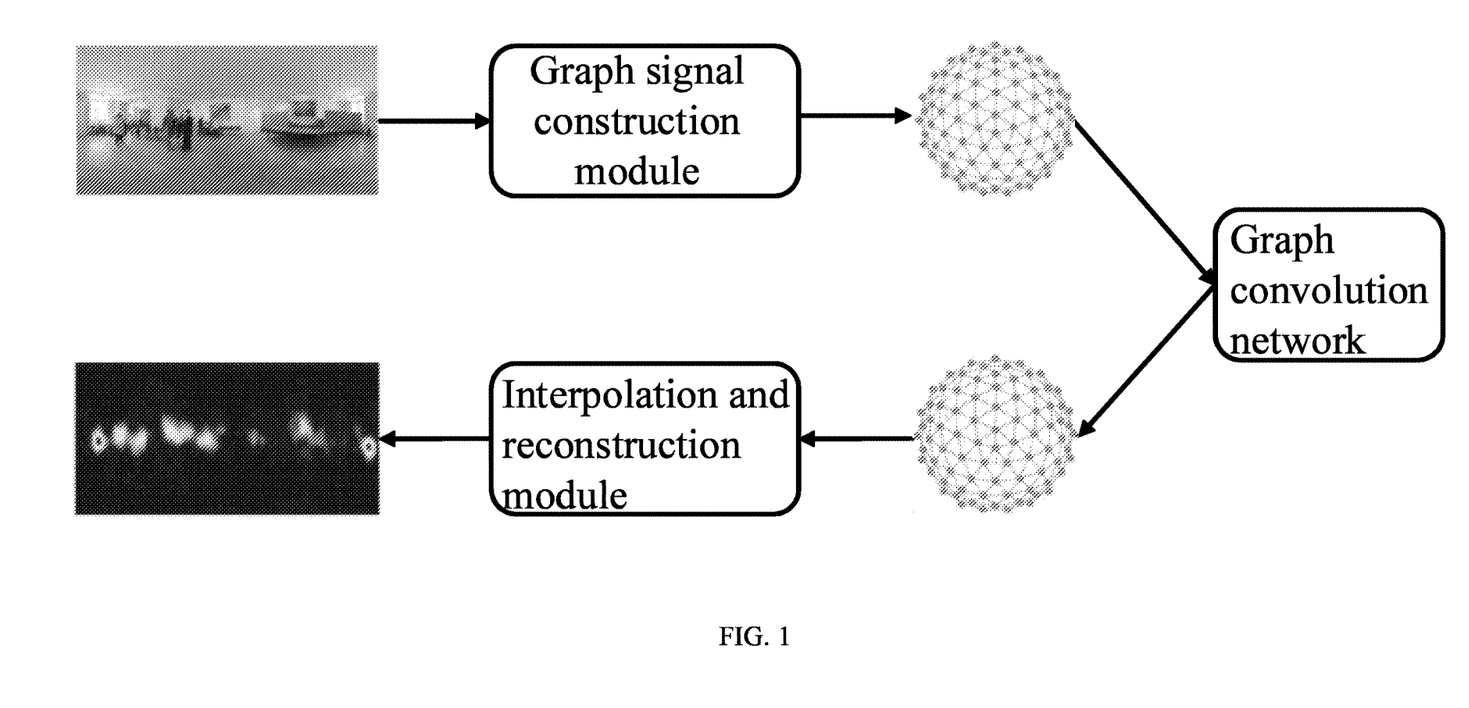
FIG. 1 is a flow chart of a saliency prediction method for a 360-degree image based on a graph convolutional neural network in an embodiment of the present disclosure.
Figure 2:
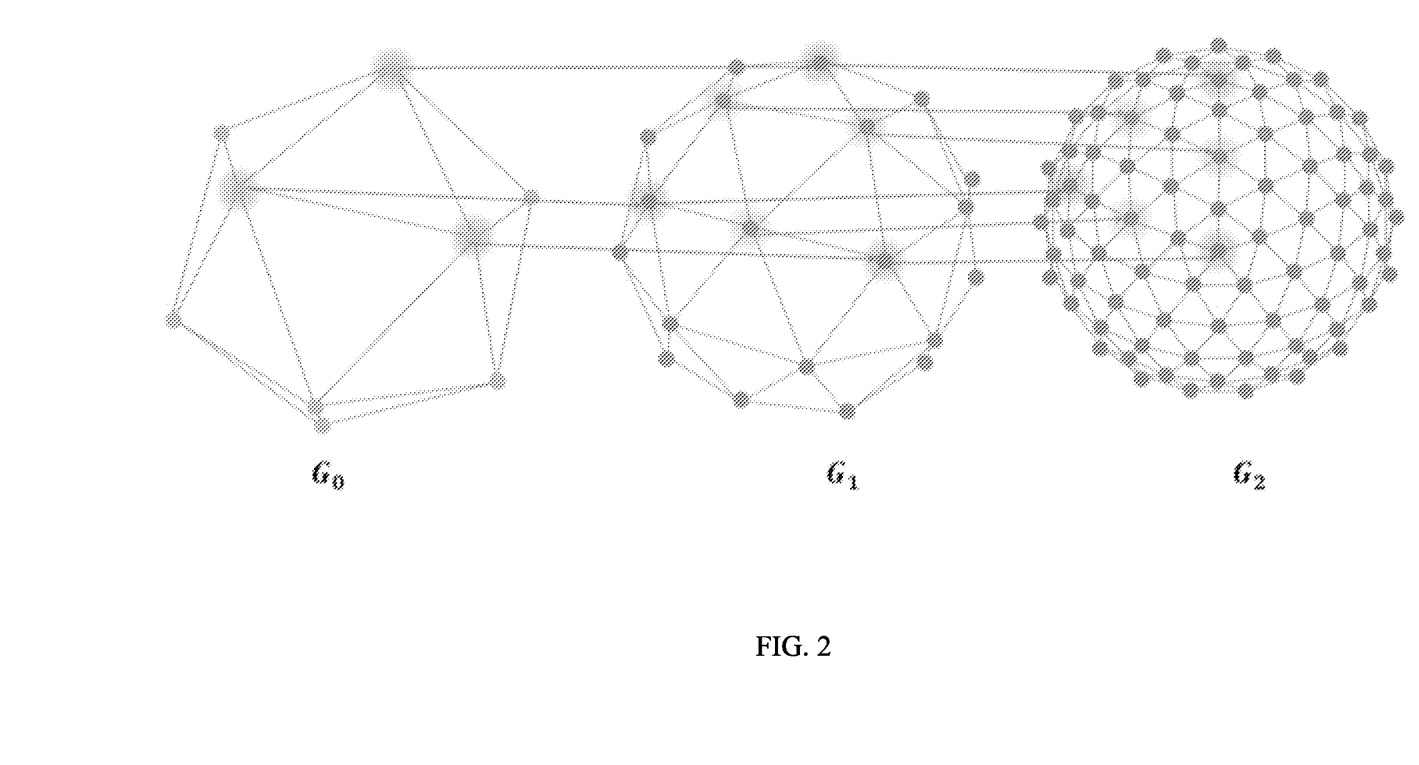
FIG. 2 is a schematic diagram of spherical graph signal construction in an embodiment of the present disclosure.

As shown in FIG. 1, specific implementation of the method includes the following steps:

1. Constructing a spherical graph signal for a spherical image As shown in FIG. 2, an example of spherical graph signal construction is analyzed; and a 360-degree image of an equidistant rectangular projection format is defined as $E_i(x, y) \in \mathbb{R}^{W \times H \times 3}$, where 3 represents a RGB channel. Then, the graph signal is constructed by a composition method based on a geodesic icosahedron; and the specific method specifically includes:

(1) firstly, constructing a largest internal icosahedron for a sphere, wherein twelve vertices of the icosahedron are used as a spherical graph signal $G_0$ of level 0;

(2) then, taking a midpoint of each side of the icosahedron and extending a center of a sphere to intersect with a spherical surface through a midpoint structural ray, wherein intersecting nodes are new sampling points; combining the new sampling points with $G_0$ to form a spherical graph signal $G_1$ of level 1; and (3) repeating the process of (2) continuously to obtain a higher-level spherical graph signal $G_l$.

Particularly, the relationship between the number of nodes of $G_l$ and l is $N_l = 10 \times 2^{2l} + 2$.

Figure 3:
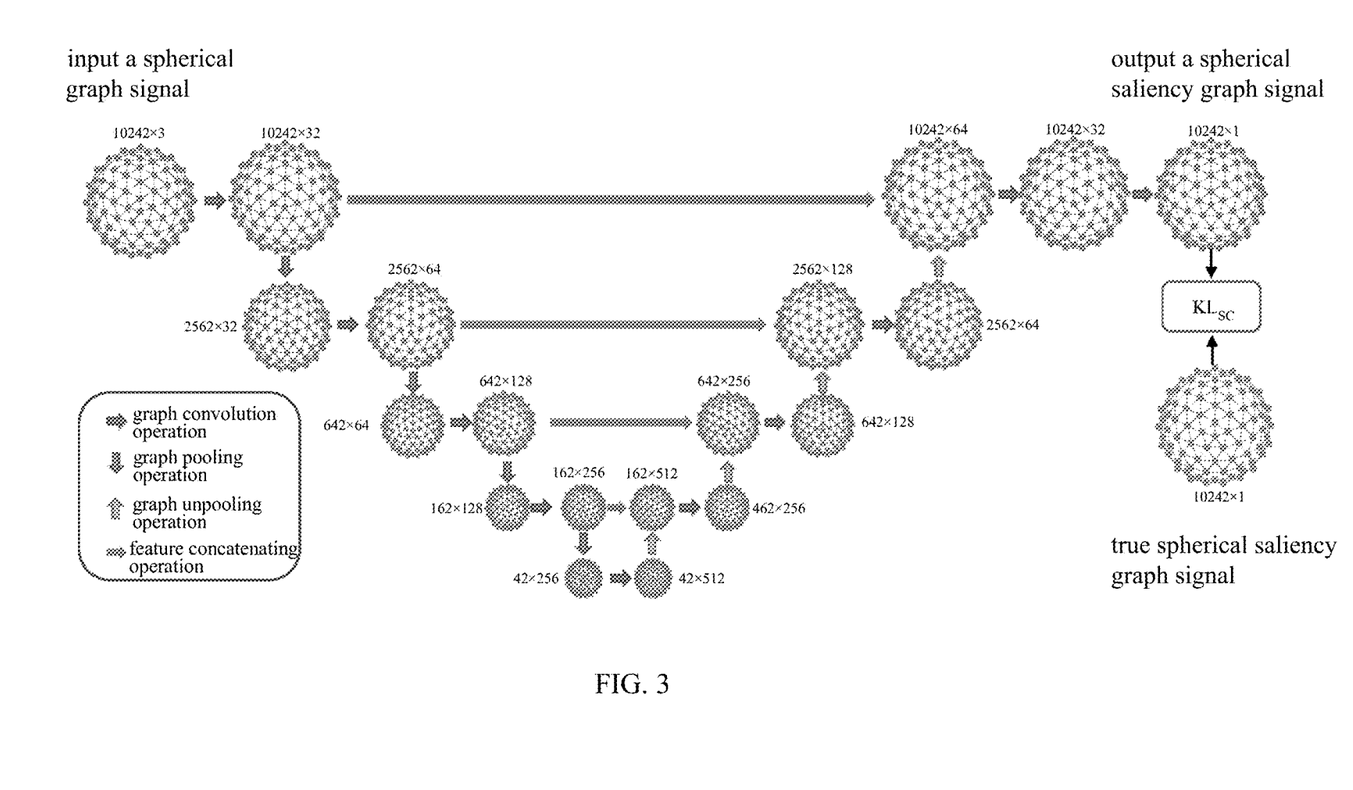
FIG. 3 is a schematic structural diagram of a graph convolutional neural network in an embodiment of the present disclosure.

2. Inputting the spherical graph signal into the graph convolutional network to generate a spherical saliency graph signal As shown in FIG. 3, the graph convolutional neural network structure uses a network structure similar to U-net, wherein a Chebyshev network (ChebNet) is used in graph convolution. Specifically, for the graph signal $G_l(V, \varepsilon, W)$ (V, ε, W respectively represent the node set, edge set and adjacency matrix of the graph signal) constructed in 1, a normalized Laplacian matrix thereof can be defined as $L = I_N - D^{-1/2}WD^{-1/2}$, in which D represents a degree matrix; and $I_N$ is the N-order identity matrix. Further convolution operation of the Chebyshev network (ChebNet) is defined as:

$$y = \left(\sum_{k=0}^{K-1} \theta_k T_k(\tilde{L})\right)x$$

Where: K represents the order of Chebyshev polynomial; $\theta_k$ is the coefficient of Chebyshev polynomial;

$$\tilde{L} = 2\frac{L}{\lambda_{max}} + I_N,$$

where $\lambda_{max}$ represents the largest eigenvalue of L; and $T_k(\tilde{L}) = 2\tilde{L}T_{k-1}(\tilde{L}) - T_{k-2}(\tilde{L})$, where $T_0 = I_N$, $T_1 = \tilde{L}$.

Figure 4:
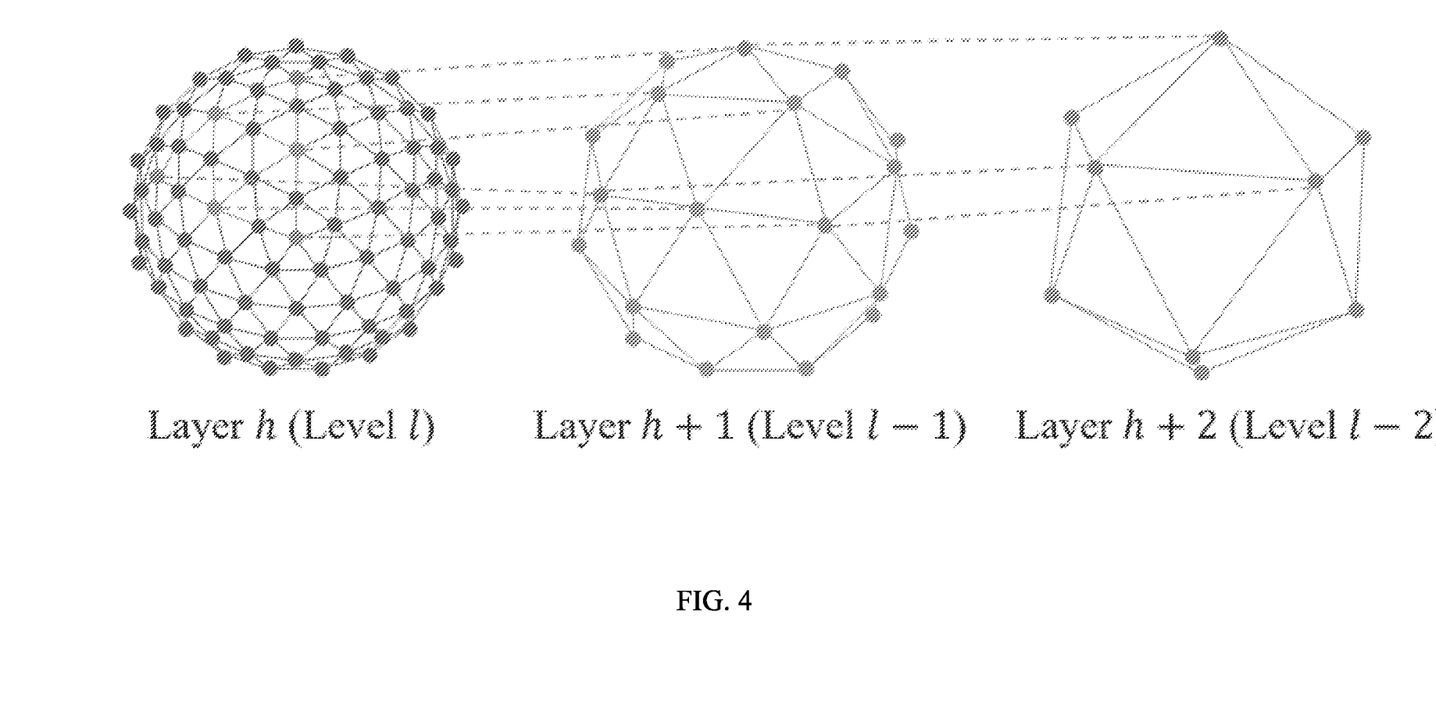
FIG. 4 is a schematic diagram of a graph pooling method in an embodiment of the present disclosure.
Figure 5:
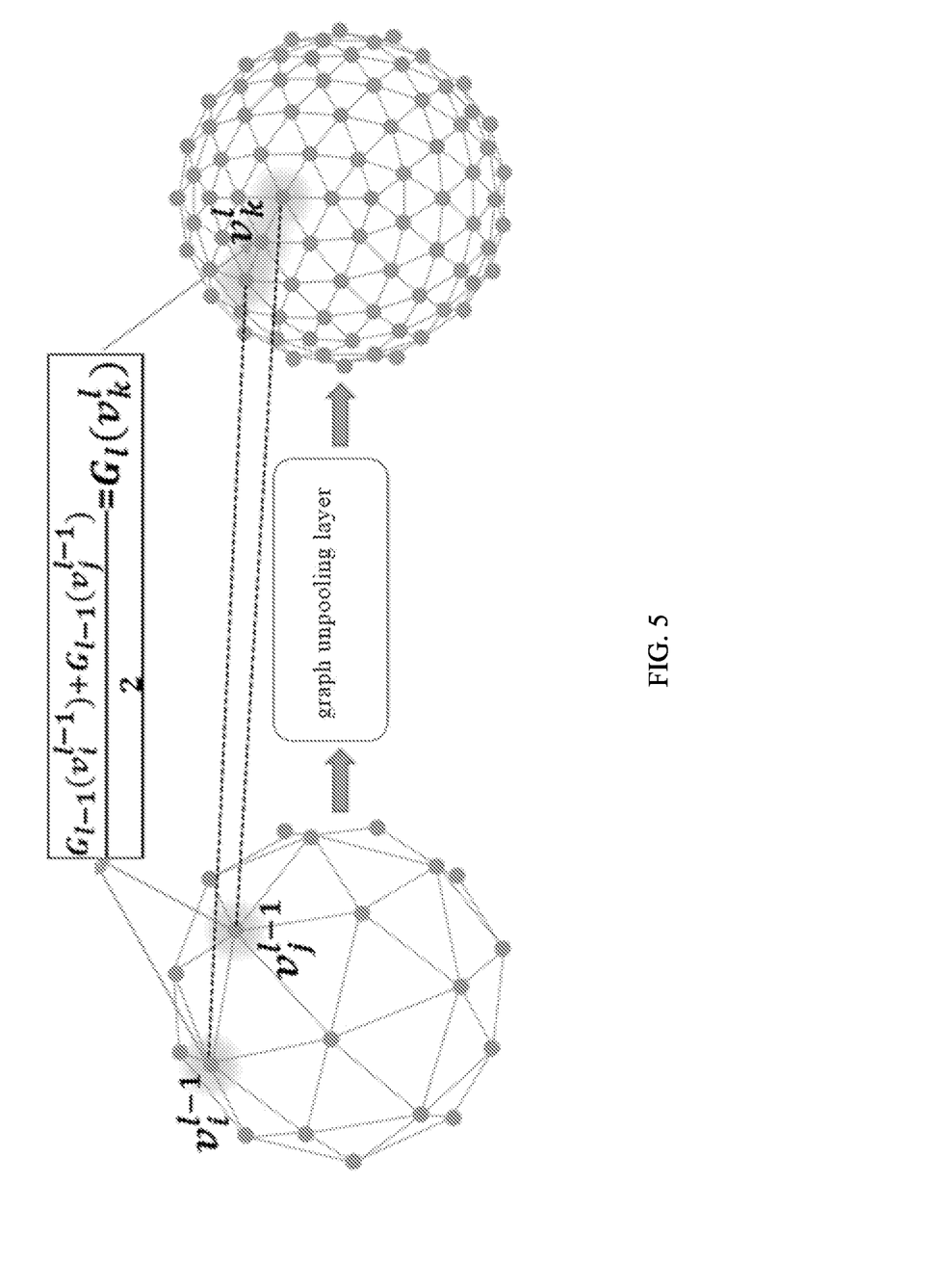
FIG. 5 is a schematic diagram of a graph unpooling method in an embodiment of the present disclosure.

FIG. 4 shows a graph pooling operation of the graph convolutional network. Here, the graph pooling operation in SGCN is directly adopted. Specifically, for the graph signal $G_l$ of level l, after the graph pooling operation, the newly added nodes from $G_{l-1}$ to $G_l$ will be discarded; and only the values of the node positions of $G_{l-1}$ will be kept. In addition, $N_l/N_{l-1} \approx 4$, namely the scaling ratio of traditional pooling operation is roughly realized. FIG. 4 shows the graph signal change relationship after multiple pooling operations in the graph convolutional network, where Layer h (Level 1) represents the level 1 graph signal corresponding to the h layer of the convolutional network; Layer h+1 (Level l−1) represents the level l−1 graph signal corresponding to the h+1 layer of the convolutional network; and Layer h+2 (Level l−2) represents the level l−2 graph signal corresponding to the h+2 layer of the convolutional network. FIG. 5 shows the proposed graph unpooling operation, which aims to realize the inverse operation of graph pooling operation. Specifically, a method of linear interpolation is used to up-sample the graph signal. $V_l$ is first defined as the node set of $G_l$, then the unpooling operation can be expressed as follows:

$$G_l(v_k^l) = \begin{cases} G_{l-1}(v_j^{l-1}) & \text{if } Pos(v_j^{l-1}) = Pos(v_k^l) \\ \dfrac{G_{l-1}(v_i^{l-1}) + G_{l-1}(v_j^{l-1})}{2} & \text{if } Nei(v_k^l) = \{v_i^{l-1}, v_j^{l-1}\} \end{cases}$$

Figure 6:
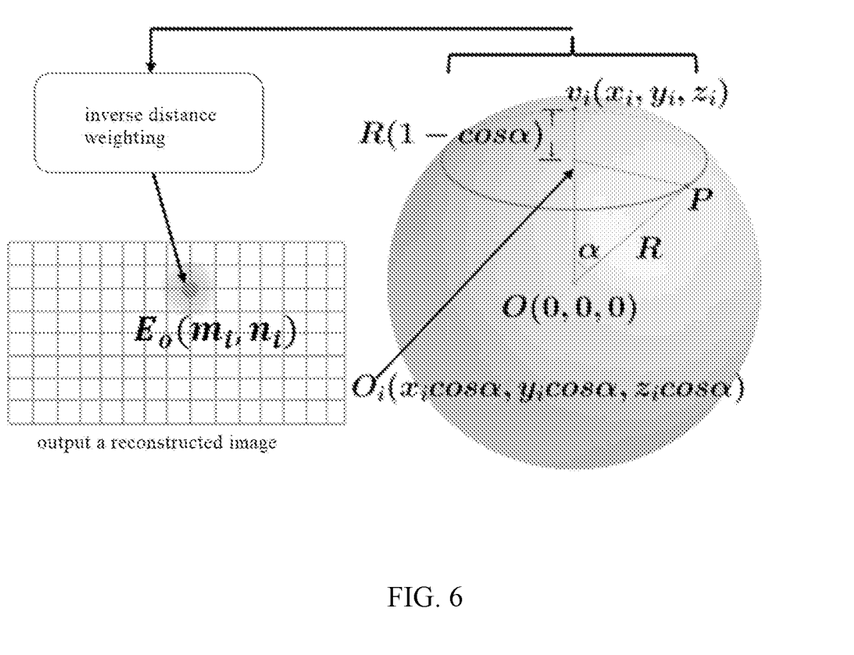
FIG. 6 is a schematic diagram of a spherical crown based interpolation algorithm in an embodiment of the present disclosure.

Where: $v_k^l$ represents the k-th node in $G_l$; Pos(·) means returning of the rectangular coordinates of the node; and Nei(·) means returning of the two neighboring nodes of the node $v_k^l$ in $G_{l-1}$. The whole interpolation process can be understood as replacing the newly added node with the average value of neighboring nodes thereof while keeping the original node. In addition, for network training, a KL divergence loss with sparse consistency is used for network training. Specifically, the whole loss function is divided into two parts, one of which is the KL divergence between the spherical graph signal output by the network and the true spherical saliency graph signal:

$$KL_s = \sum_{t=1}^{N} G_{gt}(v_t) \log\left[\frac{G_{gt}(v_t)}{G_s(v_t)}\right], \text{ where } G_s(v_t) \text{ and } G_{gt}(v_t)$$

respectively represent the spherical graph signal output by the network and the true spherical saliency graph signal. Then, in order to make $G_{gt}(v_t)$ and $G_s(v_t)$ have similarity in sparsity, the histogram distributions of $G_{gt}(v_t)$ and $G_s(v_t)$ are further calculated; and the KL divergence between the histogram distributions is calculated:

$$KL_{hist} = \sum_{i=1}^{255} hist(G_{gt})(i) \log\left[\frac{hist(G_{gt})(i)}{hist(G_s)(i)}\right],$$

where hist(·) is the operation of calculating the histogram.
3. Using the spherical saliency graph signal output in 2 to obtain a 360-degree image of an equidistant rectangular projection format by a spherical crown based interpolation algorithm As shown in FIG. 6, for an interpolation operation, grid point coordinates $(m_i, n_i)$, $1 \le i \le W \times H$ of the equidistant rectangular projection format are defined at first, wherein R represents the radius of the sphere; P represents an arbitrary point on the edge of the spherical crown; and α represents the size of the spherical crown, which chooses α=2π/W−1 here. Then the output $E_o(m_i, n_i)$ of the interpolation algorithm can represent the i-th pixel of the 360-degree image of the equidistant rectangular projection format. Then the rectangular coordinates $(x_i, y_i, z_i)$ of $(m_i, n_i)$ are calculated by the following formula:

$$\begin{cases} x_i = \sin\left(\dfrac{\lceil i/W \rceil}{H} \times \pi\right) \cos\left(\dfrac{i - \lceil i/W \rceil}{W} \times 2\pi\right) \\ y_i = \sin\left(\dfrac{\lceil i/W \rceil}{H} \times \pi\right) \sin\left(\dfrac{i - \lceil i/W \rceil}{W} \times 2\pi\right) \\ z_i = \cos\left(\dfrac{\lceil i/W \rceil}{H} \times \pi\right) \end{cases}$$

Then, a spherical crown area with a height of (R[1−cos(α)]) is constructed with $(x_i, y_i, z_i)$ as the center; and the size of the spherical crown area is controlled by α. In the present embodiment, α=2π/(W−1). The plane at the bottom of the spherical crown can be expressed as follows:

$$x_i(x - x_i \cos\alpha) + y_i(y - y_i \cos\alpha) + z_i(z - z_i \cos\alpha) = 0$$

Then, all the nodes in the spherical saliency graph signal output by the network that fall into the spherical crown area are added to the set U. Particularly, the nodes belonging to the spherical crown should satisfy the following relationship:

$$(\cos\alpha - xx_t - xx_t - xx_t)\cos\alpha \le 0$$

Finally, all the nodes in U are treated by inverse distance weighting to obtain $E_o(m_i, n_i)$; and all the points in $E_o$ in the process can be traversed to obtain the complete E. The inverse distance weighting formula is as follows:

$$E_o(m_i, n_i) = \sum_{v_t \in \mathcal{U}} \frac{G_s(v_t)}{\left(D^2(v_t) + e\right) \sum_{v_t \in \mathcal{U}} \dfrac{1}{D^2(v_t) + e}}$$

Where: e=1e−8.
Implementation effects:
According to the above steps, the method steps provided by the present embodiment are adopted for implementation. The experiment conducts network training and testing with the head+eye movement data set in Salient360 data set, and realizes comparison with SalNet360, SalGAN360, BMS360, BMS and GBVS360 on subjective and objective levels.

The method proposed in the present embodiment is at an excellent level in the intuitive level, and has better saliency prediction performance in the high latitude areas (top and bottom) of the image. Meanwhile, on the objective level, the method can achieve approximate objective performance under the condition that the computational complexity is 3 orders of magnitude lower than that of the best performance method SalGAN360.

Another embodiment of the present disclosure provides a saliency prediction system for a 360-degree image based on a graph convolutional neural network, including: a graph signal construction module configured to construct a graph signal of a 360-degree image of an equidistant rectangular projection format by using a geodesic icosahedron composition module, and generate a spherical graph signal; a graph convolutional network module configured to input the generated spherical graph signal into the graph convolutional neural network for feature extraction, and output a single-channel saliency spherical graph signal with a size identical to that of the input spherical graph signal; and an interpolation and reconstruction module configured to interpolate the output single-channel saliency spherical graph signal by using a spherical crown based interpolation algorithm, so as to convert the single-channel saliency spherical graph signal into an image of an equidistant rectangular projection format, and further reconstruct a 360-degree saliency map of the equidistant rectangular projection format, and predict saliency of the 360-degree image according to the reconstructed 360-degree saliency map of the equidistant rectangular projection format. As a preferred embodiment, the geodesic icosahedron composition module adopts a spherical graph signal generated by a geodesic icosahedron composition method in SGCN.

As a preferred embodiment, the graph convolutional neural network adopts an encoder-decoder network structure, and includes: an encoder including 5 graph convolutional layers and 4 graph pooling layers, and encoding the input spherical graph signal into a high-dimensional graph signal with the size of 1/256 of an original size; a decoder including 5 graph convolutional layers and 4 graph unpooling layers, and decoding the high-dimensional graph signal encoded by the encoder into a one-dimensional graph signal with the same size as the input spherical graph signal to represent saliency distribution; and inputs of first 4 graph convolutional layers of the decoder are respectively constituted by connection of the output of the previous graph convolutional layer with a feature graph with the same number of nodes in the decoder part.

As a preferred embodiment, the system is defined as a graph node level regression model; and the saliency prediction result is an objective optimization problem of the regression model, so that:

$$\min_{\theta_k} \sum_{t=0}^{N} dist | GICOPix(E_{gt})[v_t], N_G(GICOPix(E_i))[v_t] |$$

Where: $E_i$ and $E_{gt}$ respectively represent the 360-degree image of the equidistant rectangular projection format and a corresponding true saliency map, which are constructed into spherical graph signals with the same number of nodes by the geodesic icosahedron composition module GICOPix($\cdot$). Then, the constructed spherical graph signals are input into the graph convolutional neural network $N_G(\cdot)$ to generate the saliency spherical graph signals predicted by the network. The objective optimization process is to optimize learnable weights $\theta_k$, so that the distance between the saliency spherical graph signal output by the graph convolutional neural network and the true saliency graph signal is as small as possible, thereby realizing training of the regression model.

The saliency prediction method and system for the 360-degree image based on the graph convolutional neural network provided by the above embodiments of the present disclosure include: firstly, constructing an image of an equidistant rectangular projection format into a spherical graph signal by using a geodesic icosahedron composition method; then inputting the spherical graph signal into the proposed graph convolutional neural network for feature extraction and generation of a spherical saliency graph signal; and then reconstructing the spherical saliency graph signal into a saliency map of an equidistant rectangular projection format by using a proposed spherical crown based interpolation algorithm. In order to realize effective model training of the method and system, the present disclosure further proposes a KL divergence loss function with sparse consistency. The saliency prediction method and system for the 360-degree image provided by the above embodiments of the present disclosure can achieve excellent saliency prediction performance subjectively and objectively, and are superior to an existing method in computational complexity. It should be noted that the steps in the method provided by the present disclosure can be realized by using the corresponding modules, devices, units, etc. in the system; and those skilled in the art can refer to the technical solution of the system to realize the step flow of the method, that is, the embodiments in the system can be understood as the preferred embodiments for realizing the method, which will not be repeated here. The specific embodiments of the present disclosure have been described above. It should be understood that the present disclosure is not limited to the above specific embodiments; and those skilled in the art can make various changes or modifications within the scope of the claims, which will not affect the essential content of the present disclosure.

What is claimed is:

1. A saliency prediction method for a 360-degree image based on a graph convolutional neural network, comprising:
   constructing a graph signal of a 360-degree image of an equidistant rectangular projection format by using a geodesic icosahedron projection technology, and generating a spherical graph signal;
   inputting the generated spherical graph signal into the graph convolutional neural network for feature extraction, and outputting a single-channel saliency spherical graph signal with a size identical to that of the input spherical graph signal;
   interpolating the output single-channel saliency spherical graph signal by using a spherical crown based interpolation algorithm, so as to convert the single-channel saliency spherical graph signal into an image of an equidistant rectangular projection format, and further reconstruct a 360-degree saliency map of the equidistant rectangular projection format; and
   predicting saliency of the 360-degree image according to the reconstructed 360-degree saliency map of the equidistant rectangular projection format;
   wherein the geodesic icosahedron projection technology adopts a geodesic icosahedron composition method in a spherical graph convolutional network (SGCN), and the geodesic icosahedron composition method comprises:
   firstly, constructing a largest internal icosahedron for the 360-degree image, wherein twelve vertices of the icosahedron are used as a spherical graph signal of level 0;
   then, taking a midpoint of each edge of the icosahedron and extending a center of a sphere to intersect with a spherical surface through a midpoint structural ray, wherein intersecting nodes are new sampling points; combining the new sampling points with sampling points of level 0 to form a spherical graph signal of level 1; and based on the obtained new sampling points, repeating the process continuously to generate a higher-level spherical graph signal, which is the generated spherical graph signal.

2. The saliency prediction method according to claim 1, wherein the graph convolutional neural network comprises a graph convolutional layer, a graph pooling layer and a graph unpooling layer;
   the graph convolutional layer adopts a convolution operation in a Chebyshev network (ChebNet) to extract features of a spherical graph signal;

the graph pooling layer adopts a rotation equivariant pooling operation in SGCN to down-sample the spherical graph signal; and the graph unpooling layer introduces feature information of neighboring nodes in an unpooling process, and up-samples the spherical graph signal.

3. The saliency prediction method according to claim 2, wherein the graph convolutional neural network adopts an encoder-decoder network structure and comprises:

an encoder comprising 5 graph convolutional layers and 4 graph pooling layers, and encoding the input spherical graph signal into a high-dimensional graph signal with the size of 1/256 of an original size;

a decoder comprising 5 graph convolutional layers and 4 graph unpooling layers, and decoding the high-dimensional graph signal encoded by the encoder into a one-dimensional graph signal with a same size as the input spherical graph signal to represent saliency distribution; and inputs of first 4 graph convolutional layers of the decoder are respectively constituted by connection of the output of the previous graph convolutional layer with a feature graph with a same number of nodes in the decoder part.

4. The saliency prediction method according to claim 1, wherein the graph convolutional neural network uses a Kullback-Leibler (KL) divergence loss function with a sparse consistency feature for network training; and the KL divergence loss function $KL_{sc}$ is expressed as:

$$KL_{sc} = \frac{\lambda}{1+\lambda}KL_s + \frac{1}{1+\lambda}KL_{hist}$$

where:

$$KL_s = \sum_{t=1}^{N} G_{gt}(v_t) \log\left[\frac{G_{gt}(v_t)}{G_s(v_t)}\right],$$

$$KL_{hist} = \sum_{i=1}^{255} hist(G_{gt})(i) \log\left[\frac{hist(G_{gt})(i)}{hist(G_s)(i)}\right]$$

where: $G_{gt}(v_t)$ and $G_s(v_t)$ represent a spherical graph signal constructed by a true saliency map and a spherical saliency graph signal predicted by the network, respectively; $KL_s$ represents the traditional KL divergence loss of $G_{gt}(v_t)$ and $G_s(v_t)$; hist( · ) represents histogram solution of a vector, which here means solution of histogram distribution of values of the spherical graph signal; then the histogram distribution of $G_{gt}(v_t)$ and $G_s(v_t)$ is calculated to obtain $KL_{hist}$;

and finally the loss function $KL_{sc}$ with sparse consistency is obtained by introducing a weighting $\lambda$.

5. The saliency prediction method according to claim 1, wherein the spherical crown based interpolation algorithm comprises:

firstly, calculating spherical coordinates of grid points of a standard equidistant rectangular projection format;

secondly, constructing a spherical crown with a fixed size on the spherical surface with each grid point as the center;

then, counting all the nodes falling on the spherical crown in a single-channel saliency spherical graph signal and calculating an Euclidean distance between the nodes and the center of the spherical crown; and finally, calculating pixel values of the center of the spherical crown, i.e., the grid points of the equidistant rectangular projection format, by inverse distance weighting of all the nodes falling on the spherical crown in the single-channel saliency spherical graph signal, and reconstructing the 360-degree saliency map of the equidistant rectangular projection format.

6. The saliency prediction method according to claim 1, further comprising:

smoothing the obtained 360-degree saliency map of the equidistant rectangular projection format by a Gaussian kernel to obtain a smoother saliency map.

7. A saliency prediction system for a 360-degree image based on a graph convolutional neural network, comprising:

a graph signal construction module configured to construct a graph signal of a 360-degree image of an equidistant rectangular projection format by using a geodesic icosahedron composition module, and generate a spherical graph signal;

a graph convolutional network module configured to input the generated spherical graph signal into the graph convolutional neural network for feature extraction, and output a single-channel saliency spherical graph signal with a size identical to that of the input spherical graph signal; and an interpolation and reconstruction module configured to interpolate the output single-channel saliency spherical graph signal by using a spherical crown based interpolation algorithm, so as to convert the single-channel saliency spherical graph signal into an image of an equidistant rectangular projection format, and further reconstruct a 360-degree saliency map of the equidistant rectangular projection format, and predict saliency of the 360-degree image according to the reconstructed 360-degree saliency map of the equidistant rectangular projection format;

wherein the geodesic icosahedron projection technology adopts a geodesic icosahedron composition method in SGCN, and the geodesic icosahedron composition method comprises:

firstly, constructing a largest internal icosahedron for the 360-degree image, wherein twelve vertices of the icosahedron are used as a spherical graph signal of level 0;

then, taking a midpoint of each edge of the icosahedron and extending a center of a sphere to intersect with a spherical surface through a midpoint structural ray, wherein intersecting nodes are new sampling points; combining the new sampling points with sampling points of level 0 to form a spherical graph signal of level 1; and based on the obtained new sampling points, repeating the process continuously to generate a higher-level spherical graph signal, which is the generated spherical graph signal.

8. The saliency prediction system according to claim 7, wherein the graph convolutional neural network adopts an encoder-decoder network structure, and comprises an encoder comprising 5 graph convolutional layers and 4 graph pooling layers, and encoding the input spherical graph signal into a high-dimensional graph signal with the size of 1/256 of the original size; a decoder comprising 5 graph convolutional layers and 4 graph unpooling layers, and decoding the high-dimensional graph signal encoded by the encoder into a one-dimensional graph signal with the same size as the input spherical graph signal to represent saliency distribution; and inputs of first 4 graph convolutional layers of the decoder are respectively constituted by connection of the output of the previous graph convolutional layer with a feature graph with the same number of nodes in the decoder part.

9. The saliency prediction system according to claim 8, wherein the system is defined as a graph node level regression model; and the saliency prediction result is an objective optimization problem of the regression model, so that:

$$\min_{\theta_k} \sum_{t=0}^{N} dist|GICOPix(E_{gt})[v_t], N_G(GICOPix(E_i))[v_t]|$$

where: $E_i$ and $E_{gt}$ respectively represent the 360-degree image of the equidistant rectangular projection format and a corresponding true saliency map, which are constructed into spherical graph signals with the same number of nodes by the geodesic icosahedron composition module $GICOPix(\cdot)$ then, the constructed spherical graph signals are input into the graph convolutional neural network $N_G(\cdot)$ to generate the saliency spherical graph signals predicted by the network; the objective optimization process is to optimize learnable weights $\theta_k$, so that the distance between the saliency spherical graph signal output by the graph convolutional neural network and the true saliency graph signal is as small as possible, thereby realizing training of the regression model.

* * * * *